A. W. BRINKERHOFF.

Inkstands.

No. 6,200. Reissued Jan. 5, 1875.

WITNESSES

L. L. Frame

George E. Howe

INVENTOR

A. W. Brinkerhoff,

Chipman & Osmer & Co,

ATTORNEYS

UNITED STATES PATENT OFFICE.

ALEXANDER W. BRINKERHOFF, OF UPPER SANDUSKY, OHIO.

IMPROVEMENT IN INKSTANDS.

Specification forming part of Letters Patent No. 126,514, dated May 7, 1872; reissue No. 6,200, dated January 5, 1875; application filed October 4, 1873.

*To all whom it may concern:*

Be it known that I, ALEXANDER W. BRINKERHOFF, of Upper Sandusky, in the county of Wyandot and State of Ohio, have invented a new and valuable Improvement in Inkstands; and I do hereby declare that the following is a full, clear, and exact description of the construction and operation of the same, reference being had to the annexed drawings, making a part of this specification, and to the letters and figures of reference marked thereon.

Figure 1:
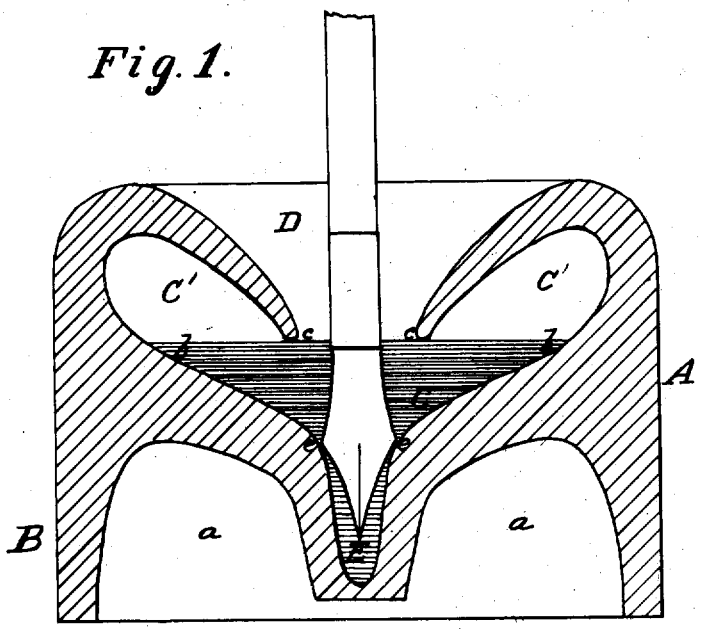
Figure 2:
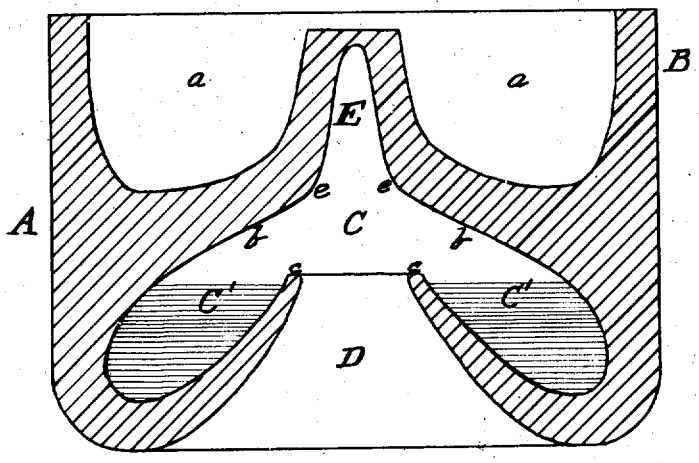

Figure 1 of the drawing is a representation of a transverse vertical section of my inkstand. Fig. 2 is the same inverted.

My invention consists in an upwardly-flaring-bottom ink-receptacle, having a deep narrow ink-well extending down from it, in which all the sediment precipitated from the ink will be concentrated by gravitation, and be retained in said well by adhesion, so that it may be conveniently removed through the pen-orifice when the inkstand is turned on its side; also, in an ink-chamber having an interior conical bottom, terminating at its lowest portion in a narrow dipping ink-well, the diameter of which is less than the broadest portion of an ordinary writing-pen, for the purpose hereinafter described.

The following description of my invention will enable others skilled in the art to make and use it.

In the annexed drawings, A represents the body of the inkstand; B, a skirting or flange support therefor; C, the receptacle or ink-chamber; D, the inverted conical top, and E the narrow ink-well. The body A may be cylindrical, or of any other suitable shape. The flange B surrounds a space, *a*, which is left for the purpose of giving lightness to the inkstand, and to provide for the depressed lower end of the ink-receptacle C. The ink-receptacle C has an upwardly-flaring or conical bottom surface, *b*, which converges into a deep narrow ink-well, E. Above the ink-receptacle is the top of the inkstand. This top has the form of an inverted cone, with an opening, *c*, through its center, which is of such size as will allow a pen to be passed through it and into the well E, as shown in Fig. 1. Above the lowest part of the top D, and surrounding the same, is a chamber, C′, of such size as will receive all the ink which can be put into the ink-chamber, and which does receive this when the inkstand is inverted, as shown by Fig. 2.

It will be observed that the capacity of the chamber C′ is equal to, or a little greater than, that of the chamber C, so that when the stand is inverted the chamber C′ will hold the ink contained in the chamber C without spilling any ink from the receptacle.

The lower end of the ink-well E, which is below the conical bottom, is closed, and the upper end thereof presents a circular rounded shoulder, *e*, of such diameter, with reference to the broadest part of an ordinary writing-pen, that it checks the pen before the nib thereof can strike the bottom of the well. A pen cannot, therefore, be injured by introducing it into the stand; and while this is the case, the nib of the pen may be passed far enough into the well to take up every drop of ink therein.

The ink-well E should be of such depth as to allow all the sediment which is precipitated from the ink to pass below the body of ink in the receptacle. When thus deposited it will be retained by its own adhesion.

The construction of this deep narrow well, having nearly vertical walls, is especially adapted for retaining the sediment when the inkstand is held in a horizontal position for removing the sediment, as I will now explain. By simply holding the stand on its side, and thus allowing the ink to run out of the well E, and then inserting a piece of blotting-paper, or a sponge or other absorbing material, all the sediment can be removed from the interior of the dipping-well without losing any of the ink from the stand, and without the necessity of using water.

It will also be observed that the capacity of the two chambers C and C′ is so adjusted, with respect to each other, that when the stand is held on its side for the purpose of removing the sediment from the ink-well, it is impossible for any ink to escape from the hole *c*, and at the same time the ink-well will be completely emptied of its fluid contents, the solid portions remaining therein for the reasons above stated.

What I claim as my invention, and desire to secure by Letters Patent, is—

1. An ink-chamber, C, of an inkstand, having an interior conical bottom surface, *b*, narrow dipping ink-well E, the diameter of the highest part of which is less than the broadest portion of an ordinary writing-pen, for the purpose of preventing the nib of the pen from striking the bottom of the well.

2. An inkstand having the interior conical bottom surface *b*, terminating at its lowest part in a deep narrow dipping ink-well, E, having a nearly upright wall, substantially as and for the purposes specified.

In testimony that I claim the above I have hereunto subscribed my name in the presence of two witnesses.

ALEXANDER W. BRINKERHOFF.

Attest:
D. D. HARE,
J. W. ANDREWS.